United States Patent [19]
Bailey et al.

[11] Patent Number: 5,720,209
[45] Date of Patent: Feb. 24, 1998

[54] MOUNTING DEVICE FOR A TELESCOPIC TRANSDUCER

[75] Inventors: Andrew M. Bailey, Schaumburg, Ill.; Mark A. V. Chapman, Wotton-Under-Edge, United Kingdom

[73] Assignee: Renishaw PLC, Gloucestershire, United Kingdom

[21] Appl. No.: 553,437

[22] PCT Filed: Mar. 29, 1995

[86] PCT No.: PCT/GB95/00710

§ 371 Date: Dec. 1, 1995

§ 102(e) Date: Dec. 1, 1995

[87] PCT Pub. No.: WO95/26491

PCT Pub. Date: Oct. 5, 1995

[30] Foreign Application Priority Data

Mar. 29, 1994 [GB] United Kingdom .................. 9406191

[51] Int. Cl.$^6$ ............... B23B 25/06; G01D 21/00; G01B 5/00; B23Q 17/22
[52] U.S. Cl. .............. 82/152; 33/630; 33/638; 33/572; 82/173; 409/133
[58] Field of Search .............. 82/152, 173; 408/2, 408/241 G; 409/133; 33/502, 572, 630, 632, 638–642

[56] References Cited

U.S. PATENT DOCUMENTS 4,435,905 3/1984 Bryan ....................... 33/181 R

FOREIGN PATENT DOCUMENTS

| 0 314 333 | 5/1989 | European Pat. Off. . |
| 0 508 686 | 10/1992 | European Pat. Off. . |
| 0 526 056 | 2/1993 | European Pat. Off. . |
| 2 210 978 | 6/1989 | United Kingdom . |

*Primary Examiner*—Steven C. Bishop
*Attorney, Agent, or Firm*—Oliff & Berridge

[57] ABSTRACT

A mounting device for a telescopic ball-bar has a hexagonal shank retained in jaws of a chuck on a spindle of a lathe. A supporting bracket extending from the shank carries a magnetic socket in one of a plurality of locations, and receivably mounts one end of the ball-bar for universal pivotal motion. The configuration of the bracket, the spacing between the socket and the shank, and the orientation of the socket, are such that the other end of the ball-bar, which is universally pivotally mounted to the tool post of the lathe, may execute a circular trajectory of greater than 180°, which trajectory intersects the axis of rotation of the lathe.

11 Claims, 4 Drawing Sheets

MOUNTING DEVICE FOR A TELESCOPIC TRANSDUCER

BACKGROUND OF THE INVENTION

The present invention relates to a mounting device for a telescopic transducer such as a ball-bar, used for measuring the ability of the movable arm of e.g. a machine tool, such as a milling machine or a lathe, to describe a predetermined trajectory, which is usually circular. Telescopic ball-bars are known as such from, U.S. Pat. No. 4,435,905, GB 2210978, EP 526056, and EP 0508686 and include a pair of spheres and a telescopic transducer. Typically, one of the spheres is universally pivotally mounted to a fixed point on the machine, while the other sphere is universally pivotally mounted to the movable arm thereof. Any variation in the distance between the spheres during circular motion of the movable arm about the fixed point (known as following error) will be measured by the telescopic transducer, and is indicative of the extent to which the trajectory of the movable arm varies from a circular trajectory. The data acquired from the telescopic transducer can be used to correct any such error, together with other machine errors such as backlash and squareness (for example).

A problem exists when attempting to use such a ball-bar to check the following error of a lathe, in that one end of the ball-bar is fixedly mounted to the tool post of the lathe, while the other end must be fixedly mounted with respect to the spindle. Hitherto, this has meant that, with the ball-bar connected, the tool post has only been able to execute approximately one quarter of a circular trajectory. This severely limits the amount of data acquired, and the value of such data for performing calibrations and error compensation.

OBJECTS OF THE INVENTION

The present invention seeks to overcome this problem by providing a mounting device for mounting a telescoping ball-bar between the spindle and the tool post of e.g. a lathe, which enables a trajectory of in excess of 180° to be executed by the tool post.

A first aspect of the present invention provides a device for mounting an elongate telescopic transducer to a rotatable shaft of a machine tool, the device comprising: a carrying shank, retainable on a rotatable shaft of the machine; and a supporting member extending from the carrying shank which rigidly supports a fixture for receiving one end of the transducer, the fixture being spaced apart from the shank in a direction defining an axis of the device, wherein the supporting member has a cutaway portion which provides a free space between the fixture and the shank along a line defined by the axis, which, when the transducer is pivotally mounted to said fixture, enables the free end of the transducer to pivot along a path intersecting said axis.

BRIEF DESCRIPTION OF THE DRAWINGS

Embodiments of the invention will now be described, by way of example, and with reference to the accompanying drawings in which.

DETAILED DESCRIPTION OF PREFERRED EMBODIMENTS

Figure 1:
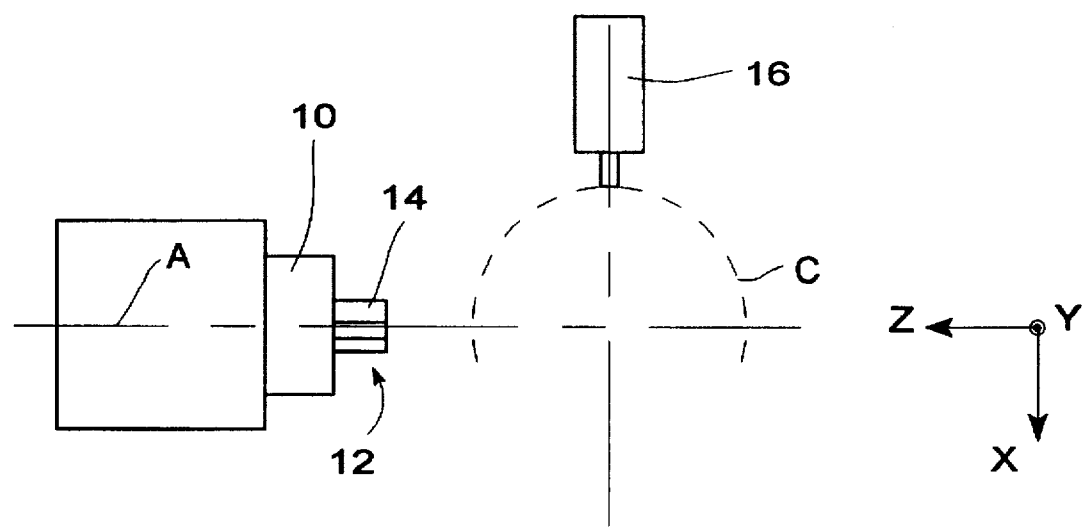
FIG. 1 is a schematic view of a lathe.

Referring now to FIG. 1, a machine tool in the form of a lathe includes a rotatable shaft in the form of a spindle 10 (which rotates about an axis A) having a chuck 12 with three equi-spaced, axially extending and radially movable jaws 14 which grip a workpiece. Machining of such a workpiece is performed by moving a tool supported on a tool carrier provided by a tool post 16 relative to the spindle until the tool (not shown) comes into contact with the workpiece. The tool post 16 is movable relative to the spindle in three orthogonal directions x,y,z. Displacement of the tool post 16 relative to a datum whose position is fixed with respect to the spindle 10 is measured by three linear encoders, and movement of the tool post 16 relative to the datum is controlled by servos which operate upon the basis of information received from the encoders.

It is desirable, in order to check the performance of the machine, to determine the ability of the servos to drive the tool post 16 in a semi-circular trajectory, denoted in FIG. 1 as C. For this purpose, a telescopic ball-bar, such as a ball-bar of the type described in our co-pending European Patent Application EP 0508686 may be employed. (Other ball-bars, such as those described in U.S. Pat. No. 4,435,905, GB 2210978 or EP 526056 may also be used.)

Figure 2:
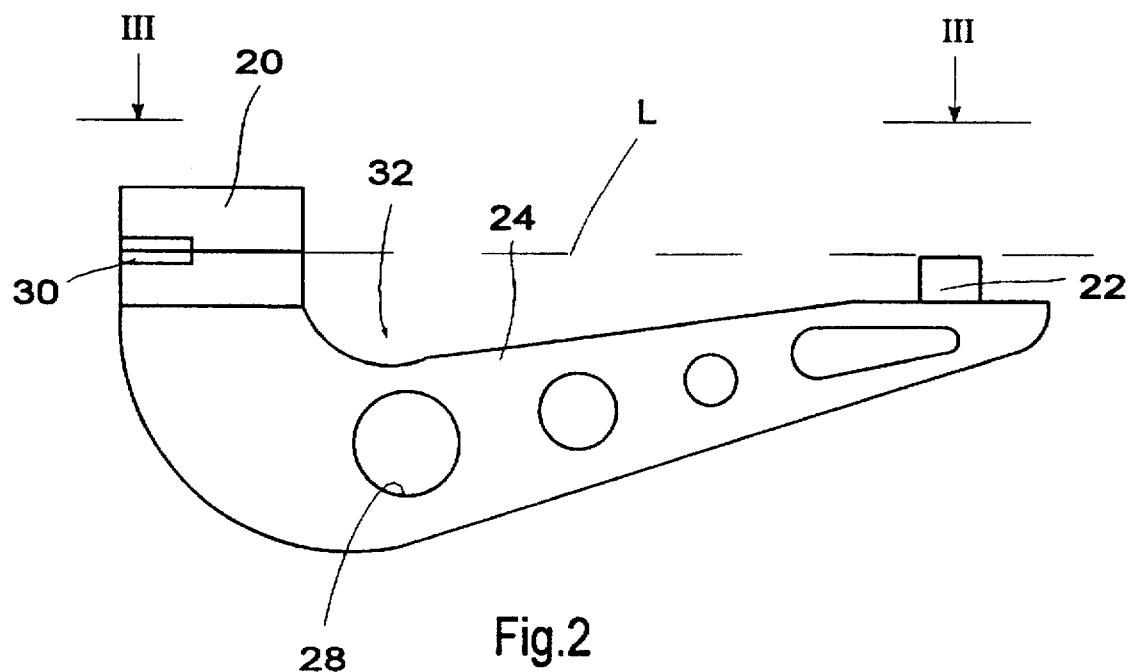
FIG. 2 is a side elevation of a mounting device in accordance with the present invention.
Figure 2A:
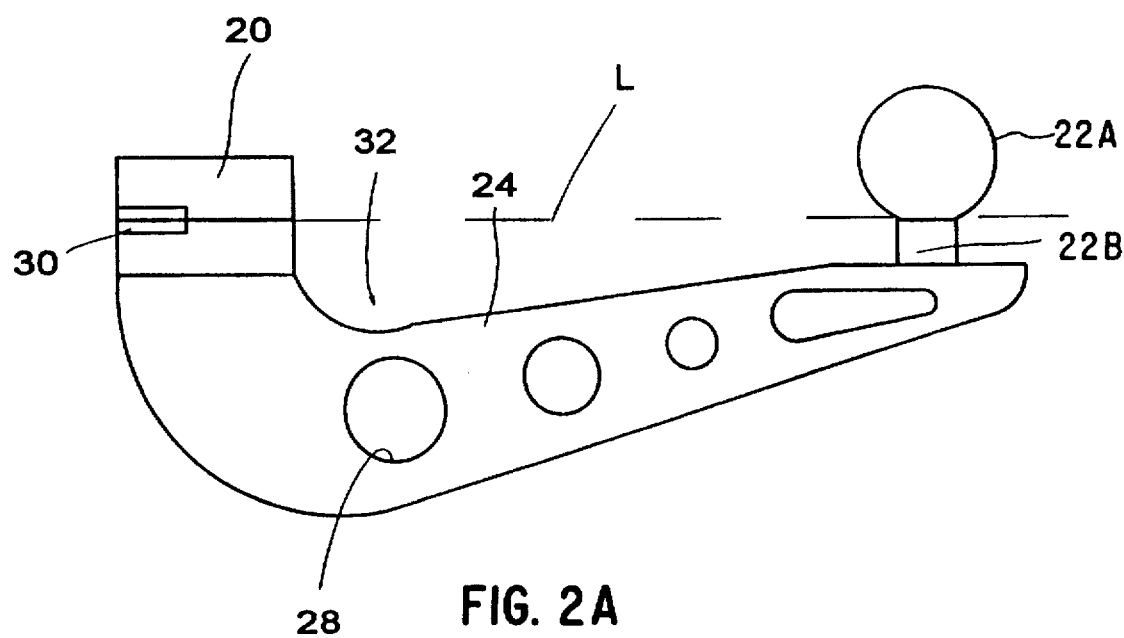
FIG. 2A is an alternative embodiment of a mounting device according to the present invention.
Figure 3:
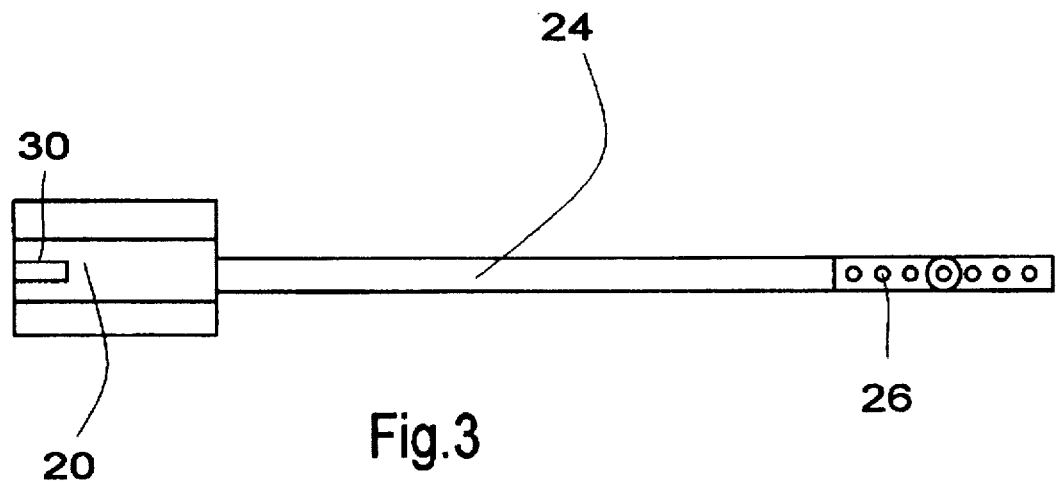
FIG. 3 is a view on III—III in FIG. 2.
Figure 5:
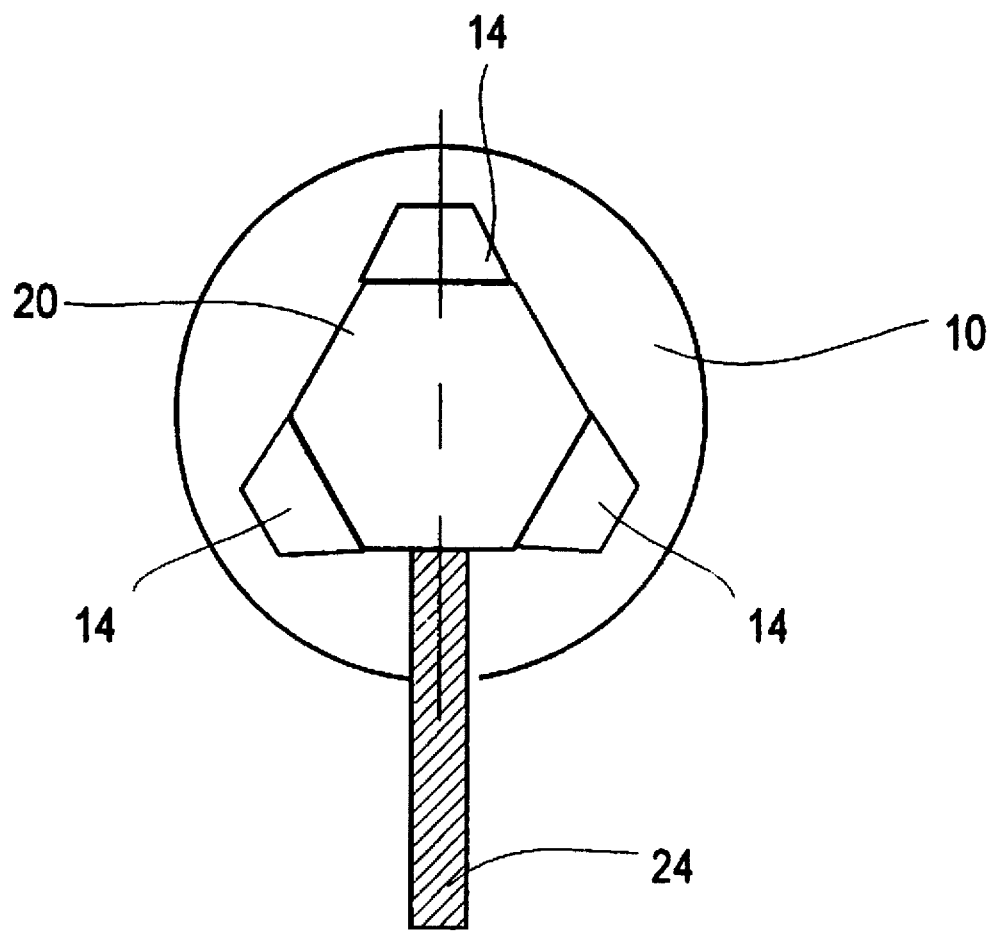
FIG. 5 is a section on V—V in FIG. 4.

Referring now to FIGS. 2, 3 and 5, a mounting device for a ball-bar includes a carrying shank 20 of hexagonal cross-section, which is engageable by the jaws 14 of the chuck 12. A fixture, in the form of a magnetic socket 22, with which one end of a ball-bar is engageable, is rigidly supported relative to the shank 20 by a supporting member in the form of an elongate bracket 24. Different types of fixture may be provided depending upon the configuration of ball-bar used; a sphere 22A supported on a stem 22B is an alternative form of such a fixture (FIG. 2B). The socket 22 is mountable upon the bracket 24 in one of a plurality of locations 26. A plurality of apertures 28 are drilled out of the bracket 24 to reduce its weight. Its configuration is such that it is stiff to forces acting upon it in the plane of the paper, but relatively flexible to forces acting transversely to the plane of the paper.

Figure 4:
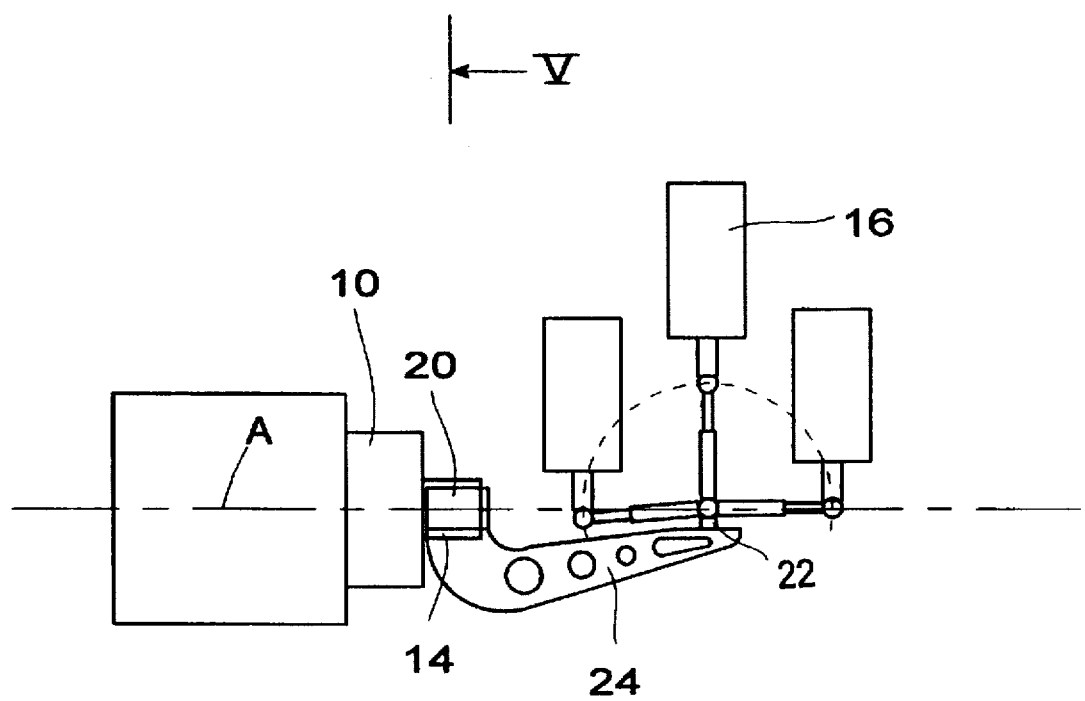
FIG. 4 illustrates the mounting device of the present invention in use on the lathe of FIG. 1.

Referring now to FIG. 4, the mounting device is retained in the spindle 10 of the machine by insertion of the hexagonal carrying shank 20 into the chuck 12 of the spindle 10. The diameter of the shank 20 and the thickness of the bracket 24 are chosen relative to each other such that the jaws 14 of the spindle chuck may grip the shank 20 without fouling on the bracket 24. This configuration is efficient in terms of the machine volume required in the z direction to accommodate the mounting device, and is illustrated in more detail in FIG. 5. On machines which are not provided with a chuck having three jaws (the most common type of chucks, a cylindrical adaptor may be fitted to the shank 20, by means of a screw-threaded bore 30 provided in the rear end thereof, and the mounting device may be retained in the spindle by engagement of the adaptor by the spindle chuck 12. Alternatively, different configurations of shank having different numbers of faces may be provided.

The socket 22 is mounted upon the bracket 24 at a location 26 whose displacement from the jaws 12 of the spindle 10 is sufficiently large, taking account of the length of the ball-bar, to provide a clearance between the tool post 16 and the shank 20. This enables the tool post 16 to execute the substantially semi-circular trajectory C. Additionally, to enable the trajectory C to intersect the axis A (which is preferable, but not essential), bracket 24 is provided with a cutaway portion 32, which provides free space along a line L, joining the socket 22 and shank 20. (Preferably, when the mounting device is retained in the chuck, line L and axis A are coincident.) As mentioned above, it should be noted that the relative stiffness of the mounting device in the xz plane avoids any significant deflection thereof relative to the tool post 16 in this plane, which might otherwise introduce substantial errors into the data obtained from the ball-bar. By contrast, the mounting device is relatively flexible in the y direction. However, deflections thereof in the y direction will merely result in changes of length of the telescopic ball-bar whose magnitude are equal to the cosine of the deflection in the y direction. These deflections can therefore be ignored. Calibration of the machine is performed by operating the servos to move the tool post 14 in a trajectory corresponding to the trajectory C in FIGS. 1 and 4, while recording the outputs of the machine encoders and the value of the transducer reading from the ball-bar. It should be noted that the configuration of the mounting device, and in particular the configuration of the bracket 24 is such that the trajectory C may be extended to an angle of greater than 180°. This is advantageous because it enables the calibration to take account of machine backlash as 3 points.

I claim:

1. A device for pivotably mounting an elongate telescopic transducer to a rotatable shaft of a machine tool, the device comprising: a carrying shank, retainable on a rotatable shaft of the machine; and a supporting member connected rigidly to and extending from the carrying shank, the supporting member rigidly supporting a fixture for receiving one end of the transducer, the fixture being spaced apart from the shank in a direction defining an axis of the device, the supporting member having a cutaway portion which provides a free space between the fixture and the shank along a line defined by the axis, the fixture comprising at least one surface engageable by the transducer, engagement of the surface by the transducer defining a pivot point about which pivoting movement of the transducer takes place, wherein a free end of the transducer is able, by virtue of the cutaway portion, to pivot along a path intersecting the axis of the device.

2. A device according to claim 1, wherein said fixture is a magnetic socket.

3. A device according to claim 1 wherein said fixture is a sphere supported on a stem.

4. A device according to claim 1 wherein said fixture is locatable on said supporting member at a plurality of positions, spaced apart in a direction substantially parallel to said axis.

5. A device according to claim 1 wherein said shank has a plurality of substantially plane surfaces to enable engagement thereof by the jaws of a chuck provided on said shaft.

6. A machine tool comprising:

a shaft, said shaft being rotatable about an axis;

a tool-carrier, the shaft and tool carrier being movable one relative to the other with two linear degrees of freedom;

an elongate telescopic transducer, universally pivotally mounted at one end to the shaft, and at the other end to the tool-carrier;

a device for mounting one end of the transducer to the shaft, having a shank retainable on the shaft, a supporting member rigidly connected to and extending from the shank, and a fixture rigidly located on said supporting member and spaced axially from said shank, said one end of the transducer being engaged with said fixture in a manner permitting said universal pivotal motion, wherein the axial spacing between the fixture and the shank is greater than the length of the transducer, and wherein the orientation of said fixture enables said tool carrier to locate said other end of the transducer between said one end and the shaft.

7. A device according to claim 6 wherein the centre of said universal pivotal motion is located on said axis.

8. A device according to claim 7 wherein said supporting member has a cutaway portion which provides a free space between the fixture and the shank along a line extending from the fixture to the shank.

9. A device according to claim 6 wherein said fixture is provided by one of a magnetic socket and a sphere supported on a stem.

10. A device according to claim 6 wherein said fixture is locatable on said supporting member at a plurality of positions, spaced apart in a direction substantially parallel to said axis.

11. A device according to claim 6 wherein said shank has a plurality of substantially plane surfaces to enable engagement thereof by the jaws of a chuck provided on said shaft.

* * * * *